(12) United States Patent
Sasaki

(10) Patent No.: US 8,055,434 B2
(45) Date of Patent: Nov. 8, 2011

(54) FUEL INJECTION CONTROL SYSTEM AND VEHICLE COMPRISING THE SAME

(75) Inventor: Yuichi Sasaki, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 12/363,697

(22) Filed: Jan. 30, 2009

(65) Prior Publication Data

US 2009/0198436 A1 Aug. 6, 2009

(30) Foreign Application Priority Data

Feb. 6, 2008 (JP) ................................. 2008-027084

(51) Int. Cl.
*F02D 41/06* (2006.01)

(52) U.S. Cl. ..... 701/104; 701/113; 123/491; 123/185.7; 123/179.29; 123/179.28

(58) Field of Classification Search .................. 701/102, 701/103, 104, 113; 123/179.3, 445, 491, 123/185.7, 179.28, 179.29
See application file for complete search history.

(56) References Cited

U.S. PATENT DOCUMENTS

| 4,550,373 | A | * | 10/1985 | Ito et al. ........................ 701/102 |
| 4,873,950 | A | * | 10/1989 | Furuyama .................. 123/179.3 |
| 5,699,772 | A | * | 12/1997 | Yonekawa et al. ............ 123/497 |
| 2006/0278200 | A1 | * | 12/2006 | Namari et al. ................ 123/491 |

FOREIGN PATENT DOCUMENTS

JP 2006-029303 2/2006

* cited by examiner

*Primary Examiner* — Erick Solis
(74) *Attorney, Agent, or Firm* — Dickstein Shapiro LLP

(57) ABSTRACT

A fuel injection control system for a motorcycle includes an ECU (Engine Control Unit) which calculates the amount of fuel to be injected by an injector based on data detected by various sensors. The fuel injection control system also includes a generator which supplies electric power to the injector and the ECU, and is driven in accordance with the engine, and a kick pedal for manually starting the engine by manually driving the generator with a user's foot. The ECU is configured to acquire data detected by the sensors at shorter intervals during a predetermined period before starting the engine than after the engine is started.

17 Claims, 6 Drawing Sheets

FUEL INJECTION CONTROL SYSTEM AND VEHICLE COMPRISING THE SAME

PRIORITY INFORMATION

This patent application is based on and claims priority under 35 U.S.C. §119 to Japanese Patent Application No. 2008-027084, filed on Feb. 6, 2008, the entire contents of which is hereby expressly incorporated by reference.

TECHNICAL FIELD

The present invention relates to a fuel injection control system and a vehicle comprising the same.

BACKGROUND

Conventionally, a fuel injection control device and a vehicle having the same are known (see, for example, Japanese Laid-Open Patent Application 2006-029303). Japanese Laid-Open Patent Application 2006-029303 discloses a fuel injection control device having an injector (a fuel injection device) which injects fuel to an engine, a sensor (a sensor unit) which detects data for calculating the amount of fuel to be injected by the injector, and an ECU (an Engine Control Unit) which calculates the amount of fuel which is to be injected by the injector based on data received from the sensor. The ECU of the fuel injection control device is configured to calculate the amount of an initial fuel injection by the injector based on data previously received from the sensor before starting the engine.

However, with the fuel injection control device disclosed in the abovementioned Laid-Open Patent Application, the situation arises that data acquisition from the sensor may be delayed in regard to the initial fuel injection before starting the engine. In such case, it becomes difficult for the ECU to calculate the precise amount of fuel injection by the injector in time for the initial fuel injection by the injector.

SUMMARY

The present invention is devised to solve the abovementioned problem. One of the objects of the present invention is to provide a fuel injection control system and a vehicle in which a control unit can calculate the precise amount of fuel injected by a fuel injection device even at the time of initial fuel injection before starting the engine.

In order to achieve the abovementioned object, a fuel injection control system according to a first aspect of the present invention includes a fuel injection device which injects fuel to an engine, a sensor unit which detects data for calculating an amount of fuel to be injected by the fuel injection device, a control unit which calculates the amount of fuel which is to be injected by the fuel injection device based on the data detected by the sensor unit, a power generation unit which is driven in accordance with driving of the engine and which supplies electric power to the fuel injection device and the control unit, and a manual start device configured to be driven with a human's hand or foot for starting the engine by manually driving the power generation unit, wherein the control unit is configured to acquire the data from the sensor unit at shorter intervals during a predetermined period before starting the engine than after starting the engine. With this configuration, in the predetermined period before starting the engine, the control unit can acquire more data from the sensor unit in a shorter period than after starting the engine. Consequently, even at the first time of fuel injection before starting the engine, the control unit can calculate the precise amount of fuel to be injected by the fuel injection device based on the data acquired from the sensor unit before the timing for the fuel injection by the fuel injection device.

A vehicle according to a second aspect of the present invention includes an engine, a fuel injection device which injects fuel to the engine, a sensor unit which detects data for calculating an amount of fuel to be injected by the fuel injection device, a control unit which calculates the amount of fuel which is to be injected by the fuel injection device based on the data detected by the sensor unit, a power generation unit which is driven in accordance with driving of the engine and which supplies electric power to the fuel injection device and the control unit, and a manual start device configured to be driven with a human's hand or foot for starting the engine by manually driving the power generation unit, wherein the control unit is configured to acquire the data from the sensor unit at shorter intervals during a predetermined period before starting the engine than after starting the engine.

As described above, in a second aspect, a control unit is disposed in a vehicle. The control unit calculates the amount of fuel which is to be injected by the fuel injection device based on the data detected by the sensor unit which detects the data for calculating the amount of fuel to be injected by the fuel injection device. In addition, the control unit is configured to acquire the data from the sensor unit at intervals, at least in the predetermined period before starting of the engine, shorter than intervals after starting the engine. Accordingly, in the predetermined period before starting the engine, the control unit can acquire more data from the sensor unit in a shorter period than after starting the engine. Consequently, even as of the initial fuel injection before starting the engine, the control unit can calculate the precise amount of fuel to be injected by the fuel injection device based on the data acquired from the sensor unit before the timing of the fuel injection of the fuel injection device.

DETAILED DESCRIPTION

In the following, embodiments of the present invention will be described with reference to the drawings.

Figure 1:
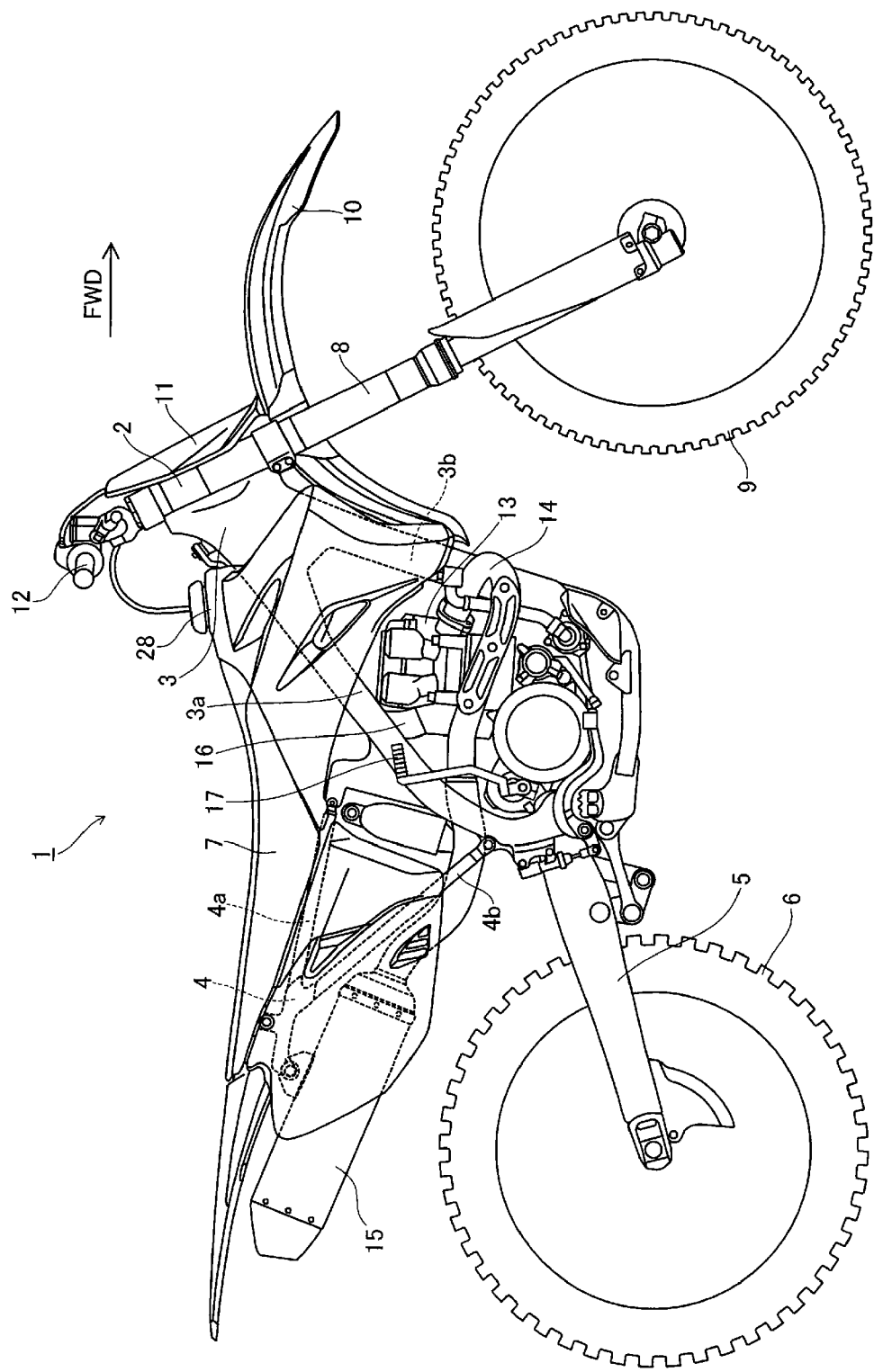
FIG. 1 is a side view showing a motorcycle according to an embodiment of the present invention.

FIG. 1 is a side view of a motorcycle 1 according to an embodiment of the present invention. FIG. 2 through FIG. 6 relate to the structure and operation of motorcycle 1 shown in FIG. 1. Here, the present embodiment is described with an off-road motorcycle as an example of a vehicle. In the figures, the direction of the arrow FWD indicates the "front side" in the travelling direction of the motorcycle. In the following, the structure of motorcycle 1 according to the present embodiment will be described with reference to FIG. 1 through FIG. 6.

As shown in FIG. 1, a main frame 3 is disposed at a rear side of a head pipe 2. Further, the main frame 3 has an upper frame portion 3a which extends rearward from the upper side and a lower frame portion 3b which extends rearward from the lower side. Further, an upper frame portion 4a and a lower frame portion 4b of a rear frame 4 are respectively connected to a center part and a rear part of the upper frame portion 3a of the main frame 3. The head pipe 2, the main frame 3, and the rear frame 4 form a body frame.

A pivot shaft (not shown) is disposed at the rear of the upper frame portion 3a of the main frame 3. A rear arm 5 is supported at its front end by the pivot shaft so as to be able to pivot in the vertical direction. A rear wheel 6 is rotatably attached to the rear end of the rear arm 5. A fuel tank 28 is disposed above the upper frame portion 3a of the main frame 3. A seat 7 is disposed at the rear side of the fuel tank 28.

Further, a front fork 8 having suspension for absorbing impact in the vertical direction is rotatably mounted to the head pipe 2 so as to operably extend below the head pipe 2. A front wheel 9 is rotatably attached to the bottom end of front fork 8. A front fender 10 is disposed above the front wheel 9. A number plate 11 that covers the front side of the head pipe 2 is disposed at the front side of the head pipe 2. A throttle 12 is rotatably disposed on a handle bar attached to the top of the head pipe 12.

In addition, an engine 13 is mounted below the upper frame portion 3a of the main frame 3. An exhaust pipe 14 is attached to a front portion of the engine 13. The exhaust pipe 14 extends rearward and is coupled to a muffler 15. Further, an intake pipe 16 is attached to a rear portion of the engine 13.

In the present embodiment, a kick pedal 17 for manually starting the engine 13 with a user's foot is attached to a rear portion of the engine 13. Here, the kick pedal 17 is an example of a "manual start device" of the present invention. A function of kick pedal 17 is to drive a generator 37 (FIG. 2), which is described later, by being rotated downward with a user's foot at the time of starting the engine 13.

Figure 2:
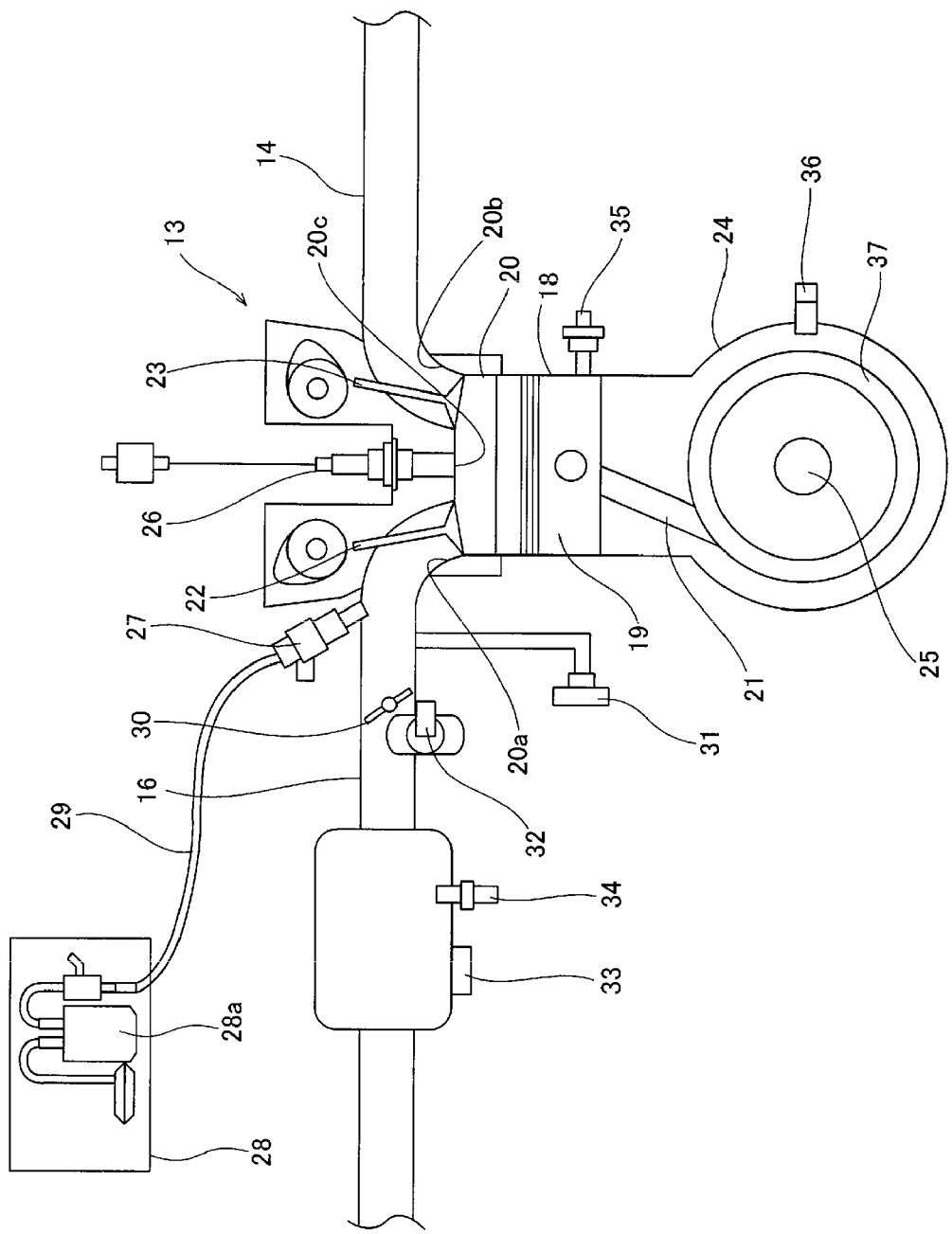
FIG. 2 is a schematic diagram showing structure disposed in the vicinity of the engine of the motorcycle shown in FIG. 1.

As shown in FIG. 2, a cylinder 18, a piston 19, which slides vertically inside the cylinder 18, and a cylinder head 20, which is disposed at the upper portion of the cylinder 18 form part of the engine 13. One end of a connecting rod 21 is rotatably attached to the piston 19. The cylinder head 20 is disposed so as to close one opening of the cylinder 18. Further, an intake port 20a and an exhaust port 20b, which are provided above the cylinder 18, are formed in the cylinder head 20. An intake valve 22 and an exhaust valve 23 are disposed in the intake port 20a and the exhaust port 20b, respectively. Furthermore, a combustion chamber 20c is formed in a portion of the cylinder 18, one opening of which is closed by the lower part of the cylinder head 20. The intake port 20a is used to supply a mixture of air and fuel to the combustion chamber 20c. An intake pipe 16 is connected to the intake port 20a. The exhaust port 20b is provided to discharge exhaust gases after combustion from the combustion chamber 20c.

The exhaust pipe 14 is connected to the exhaust port 20b. A crankcase 24 is disposed below the cylinder 18, and a crankshaft 25 is disposed in the crankcase 24. The other end of the connecting rod 21 is rotatably attached to the crankshaft 25. The crankshaft 25 is configured to be rotatable by the movement of the connecting rod 21 in accordance with the vertical sliding of the piston 19 inside the cylinder 18. Further, an ignition plug 26, which ignites the mixture of air and fuel, is operatively disposed in the cylinder head 20.

In the present embodiment, the engine 13 is a four-stroke engine comprising an intake stroke, a compression stroke, a combustion (power) stroke and an exhaust stroke in accordance with the vertical sliding movement of the piston 19. Specifically, in the intake stroke, the engine 13 is configured so that the intake port 20a is opened and the air and fuel mixture flows into the combustion chamber 20c when the piston 19 slides downward and the intake valve 22 is lifted by a cam lobe. Further, the piston 19 is configured to slide downward until the intake bottom dead center is reached, which is the bottom dead center of the cylinder 18. In the intake stroke, fuel is injected by an injector 27 which is described later.

Moreover, the engine 13 is configured so that in the compression stroke the intake port 20a is closed by the intake valve 22 and the air and fuel mixture in the cylinder 18 is compressed when the piston 19 slides upward from the intake bottom dead center. The piston 19 is configured to slide upward until the compression top dead center is reached, which is the top dead center of the cylinder 18.

The engine 13 is also configured so that in the combustion stroke piston 19 slides downward from the compression top dead center and the air and fuel mixture, which has been compressed by the piston 19 as piston 19 arrives at the compression top dead center, is ignited with a spark generated by the ignition plug 26 to combust the fuel therein. Thereafter, the piston 19 is configured to slide downward until the combustion bottom dead center is reached, which is the bottom dead center of the cylinder 18, due to the combustion of the air and fuel mixture which is expanded due to the combustion of the fuel.

Further, the engine 13 is configured so that in the exhaust stroke the exhaust port 20b is opened as the exhaust valve 23 is lifted by a cam lobe when the piston slides upward from the combustion bottom dead center. In addition, the engine 13 is configured so that the combustion gas in the combustion chamber 20c is exhausted through the exhaust port 20b by being pushed out upward by the piston 19. The piston 19 is configured to slide upward until the exhaust top dead center is reached, which is the top dead center of the cylinder 18.

In the present embodiment, the injector 27, which injects fuel to the upstream side of the intake port 20a, is disposed at the intake pipe 16 upstream from intake port 20a (FIG. 2). Here, the injector 27 is an example of a "fuel injection device" in accordance with the present invention, as other fuel injection devices may also be used. The injector 27 is configured to inject fuel by opening a solenoid valve (not shown). The injector 27 is powered by electric power output from a regulator 39 (see FIG. 3), to be described later. Here, the amount of fuel injected by the injector 27 is controlled according to the amount of time the solenoid valve stays opened. A fuel pump 28a, which supplies fuel from a fuel tank 28 to the injector 27, is connected to the injector 27 via a hose 29. A throttle valve 30, which opens and closes to adjust the amount of air flowing into the intake port 20a, is disposed within the intake pipe 16 upstream from the injector 27.

In the present embodiment, an in-pipe pressure sensor 31, which detects air pressure in the intake pipe 16, a throttle position sensor 32, which detects the extent of the opening of the throttle valve 30, an atmospheric pressure sensor 33, which detects atmospheric pressure, and an atmospheric temperature sensor 34, which detects atmospheric temperature, are operatively coupled to the intake pipe 16. Further, a water temperature sensor 35, which detects water temperature in a water jacket (not shown) which cools the cylinder 18 with coolant, and a crank angle sensor 36, which detects the rotational position of the crankshaft 25, are arranged in the engine 13. A later-described ECU 38 (see FIG. 3) is configured to control the amount of fuel injected by the injector 27 based on data detected by the in-pipe pressure sensor 31, the throttle position sensor 32, the atmospheric pressure sensor 33, the atmospheric temperature sensor 34, the water temperature sensor 35 and the crank angle sensor 36. Here, the pressure sensor 31, the throttle position sensor 32, the atmospheric pressure sensor 33, the atmospheric temperature sensor 34, the water temperature sensor 35 and the crank angle sensor 36 are respective examples of a "sensor unit" in accordance with the present invention.

Figure 4:
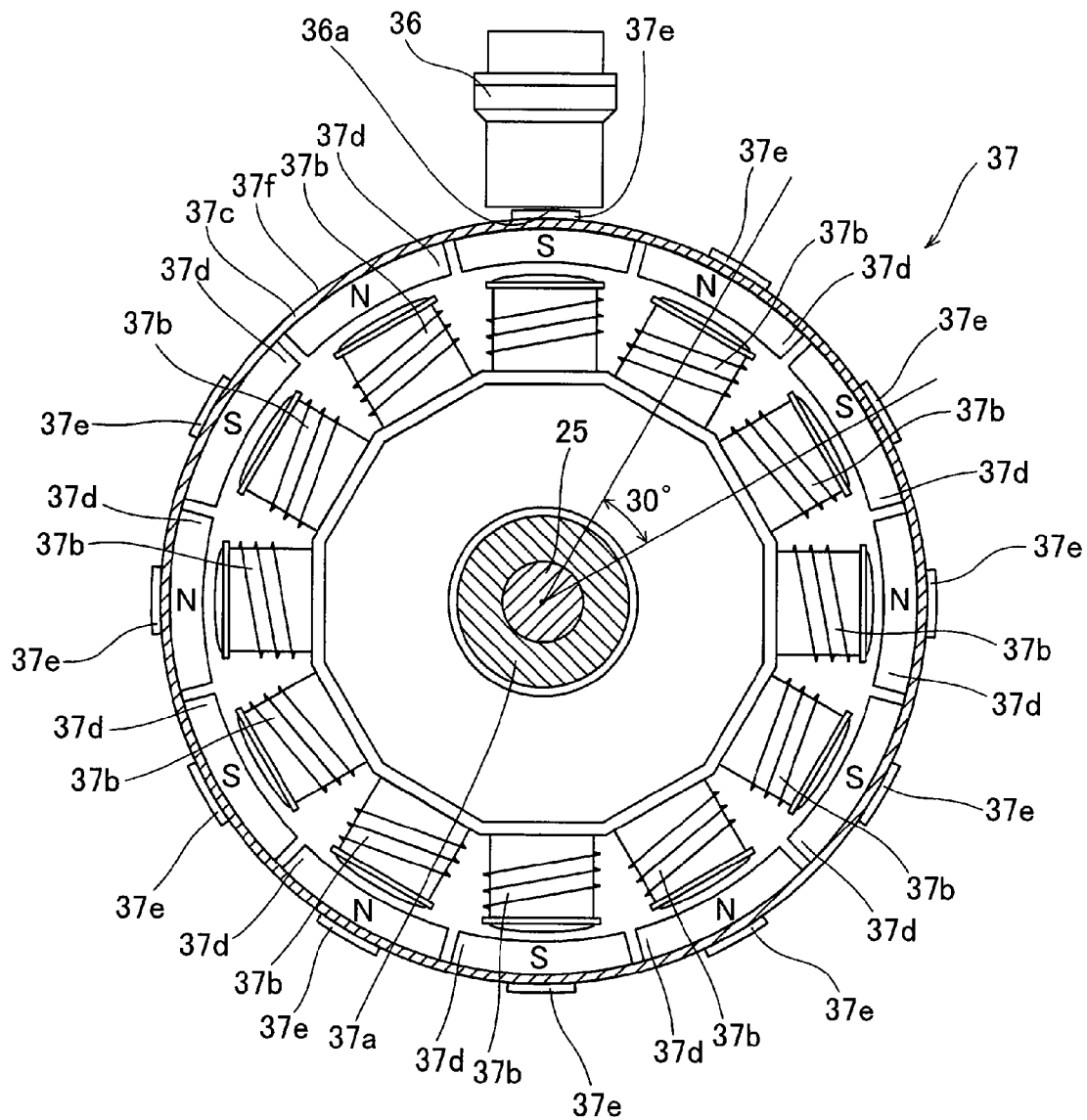
FIG. 4 is a cross-sectional view showing a power generator of the motorcycle shown in FIG. 1.

In the present embodiment, the generator 37, which is operated in accordance with the rotation of the crankshaft 25, is provided inside the crankcase 24, as shown in FIG. 2. Here, the generator 37 is an example of a "power generating unit" according to the present invention, as other power generation units may also be used. The generator 37 is configured to supply power to the ignition plug 26, the injector 27, and the fuel pump 28a. As shown in FIG. 4, the generator 37 has a core portion 37a, which has an annular cross-section and which is disposed on the outside of crankshaft 25, twelve coil portions 37b disposed at about every 30° relative to the core portion 37a (as shown in FIG. 4), a flywheel 37c, which is disposed outside the coil portions 37b, twelve magnets 37d disposed on the inner face of the flywheel 37c so as to correspond to the twelve coil portions 37b, and eleven projecting portions 37e which are disposed at about a 30° pitch (angle between neighboring bisectors) so as to face eleven of the magnets 37d and thereby sandwich the flywheel 37c there between. It is to be noted that since no battery is mounted on the motorcycle 1 (see FIG. 1) of the present embodiment, the power necessary for starting and operating the engine 13 (see FIG. 2) is directly supplied from the generator 37.

In the present embodiment, the flywheel 37c is arranged concentrically with the core portion 37a. Since the core portion 37a is fixed to the crankcase 24 (see FIG. 2), the core portion 37a and the coil portions 37b are configured not to rotate. On the other hand, the flywheel 37c is configured to rotate with the crankshaft 25. Therefore, the flywheel 37c, the magnets 37d, and the projecting portions 37e are configured to rotate with the rotation of the crankshaft 25. The generator 37 is an alternating current (AC) generator outputting AC voltage. The projecting portions 37e are provided for detection of the rotational angle position and rotational speed of the crankshaft 25. Specifically, a pulse (crank pulse signal shown in FIG. 5), which is generated when a projecting portion 37e passes by the detection surface 36a of the crank angle sensor 36 (see FIG. 4) and is detected by ECU 38 (see FIG. 3), to be described later. Projecting portions 37e rotate in accordance with the rotation of the flywheel 37c.

An extended gap portion 37f, having an angular width of about 60°, is provided on the outside of the flywheel 37c by omitting one projecting portion 37e opposite one magnet 37d. The ECU 38 (see FIG. 3) is configured to determine that the crankshaft 25 has passed a reference rotation position when the extended gap portion 37f passes by detection surface 36a of the crank angle sensor 36. The ECU 38 is also configured to detect the rotational angle and speed of crankshaft 25 based on the number and rate of crank pulse signals detected thereafter from crank angle sensor 36.

Figure 3:
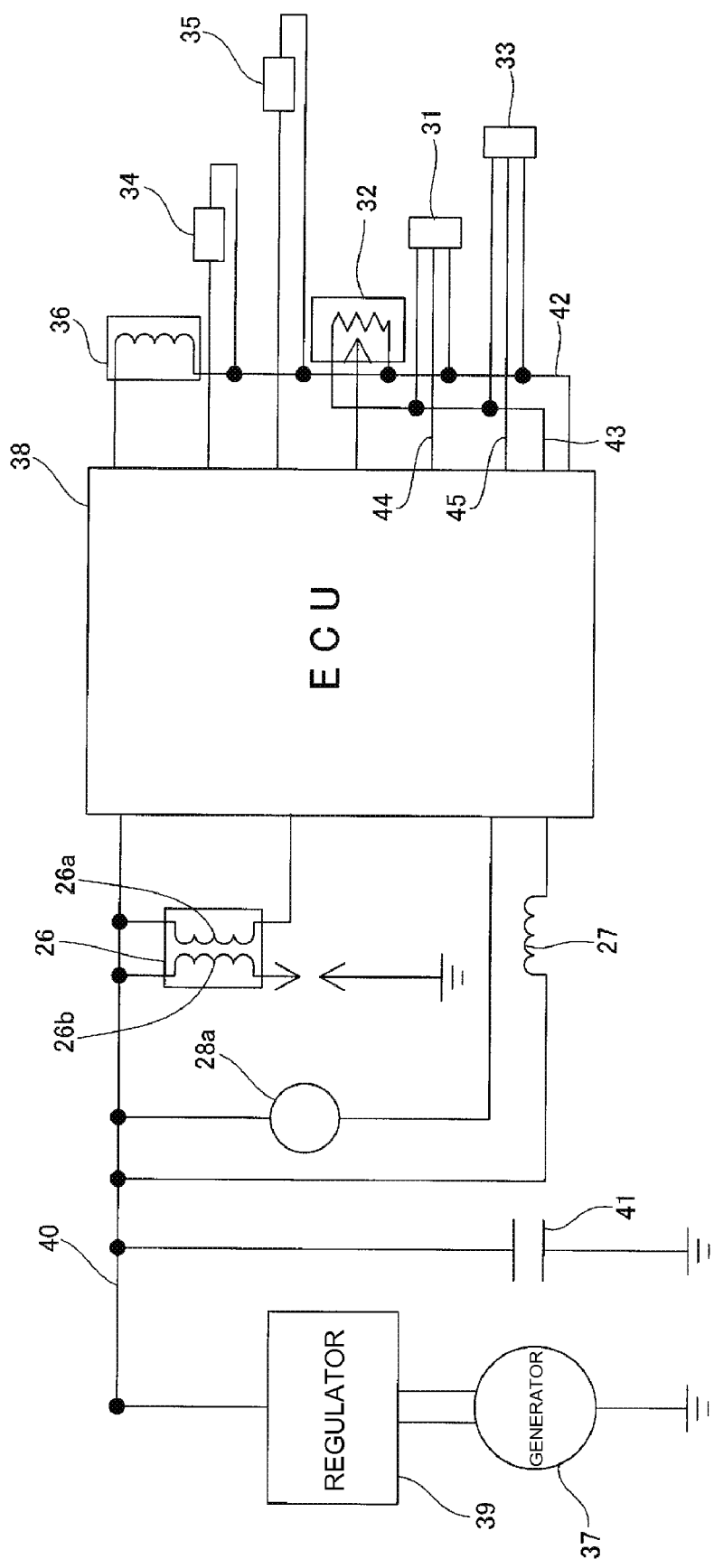
FIG. 3 is a block diagram showing a circuit configuration of the motorcycle shown in FIG. 1.

In the present embodiment, the ECU 38 is electrically connected to the generator 37, as shown in FIG. 3. Specifically, a regulator 39 is electrically connected to the generator 37, and the regulator 39 is connected to the ECU 38 via wiring 40. A capacitor 41 having one end grounded is connected to the wiring 40. Accordingly, the ECU is configured so that the electric power generated by the generator 37 is stabilized by the capacitor 41 and supplied to the ECU 38 after being rectified by the regulator 39. Here, the ECU 38 is an example of a "control module" of the present invention. Other types of control modules may also be used.

Further, the ignition plug 26, the injector 27 and the fuel pump 28a are each connected at one end to the generator 37 and the regulator 39 via the wiring 40. Further, the ignition plug 26, the injector 27 and the fuel pump 28a are each connected at the other end thereof to the ECU 38. Accordingly, the ECU 38 can control the operation of the ignition plug 26, the injector 27 and the fuel pump 28a with the electric power supplied by the generator 37. The ignition plug 26 has a primary coil 26a and a secondary coil 26b. The ignition plug 26 is configured so that the voltage of the secondary coil 26b increases due to electromagnetic induction when the electric power is supplied to the primary coil 26a from the generator 37, and so that the voltage of the secondary coil 26b momentarily increases when the electric power supply to the primary coil 26a is stopped so as to generate a spark. Further, the ECU 38 is configured to control the electric power supply from the generator 37 so as to continuously operate the fuel pump 28a. However, the ECU 38 is configured to interrupt the electric power supplied from the generator 37 to the fuel pump 28a in the case of stopping.

In the present embodiment the atmospheric temperature sensor 34, the water temperature sensor 35 and the crank angle sensor 36 are connected directly to the ECU 38 at one end and connected to the ECU 38 at the other end via the wiring 42, as shown in FIG. 3. The in-pipe pressure sensor 31, the throttle position sensor 32 and the atmospheric pressure sensor 33 are connected to the ECU 38 at one end via wiring 42 and connected to the ECU 38 at the other end via the wiring 43. Further, the in-pipe pressure sensor 31 and the atmospheric pressure sensor 33 are connected to the ECU 38 via power supply wirings 44 and 45, respectively. The pressure sensor 31, the throttle position sensor 32, the atmospheric pressure sensor 33, the atmospheric temperature sensor 34 and the water temperature sensor 35 are configured to transmit a voltage value to the ECU 38 according to respective conditions. Accordingly, by converting analog data of the voltage value at the time of passing of electric current through the various sensors (the pressure sensor 31, the throttle position sensor 32, the atmospheric pressure sensor 33, the atmospheric temperature sensor 34 and the water temperature sensor 35) into digital data (AD conversion), the ECU 38 is capable of acquiring data detected by the various sensors. Here, the fuel injection control system of the present invention comprises the kick pedal 17 (see FIG. 1), the injector 27, the pressure sensor 31, the throttle position sensor 32, the atmospheric pressure sensor 33, the atmospheric temperature sensor 34, the water temperature sensor 35, the crank angle sensor 36, the generator 37 and the ECU 38.

Figure 5:
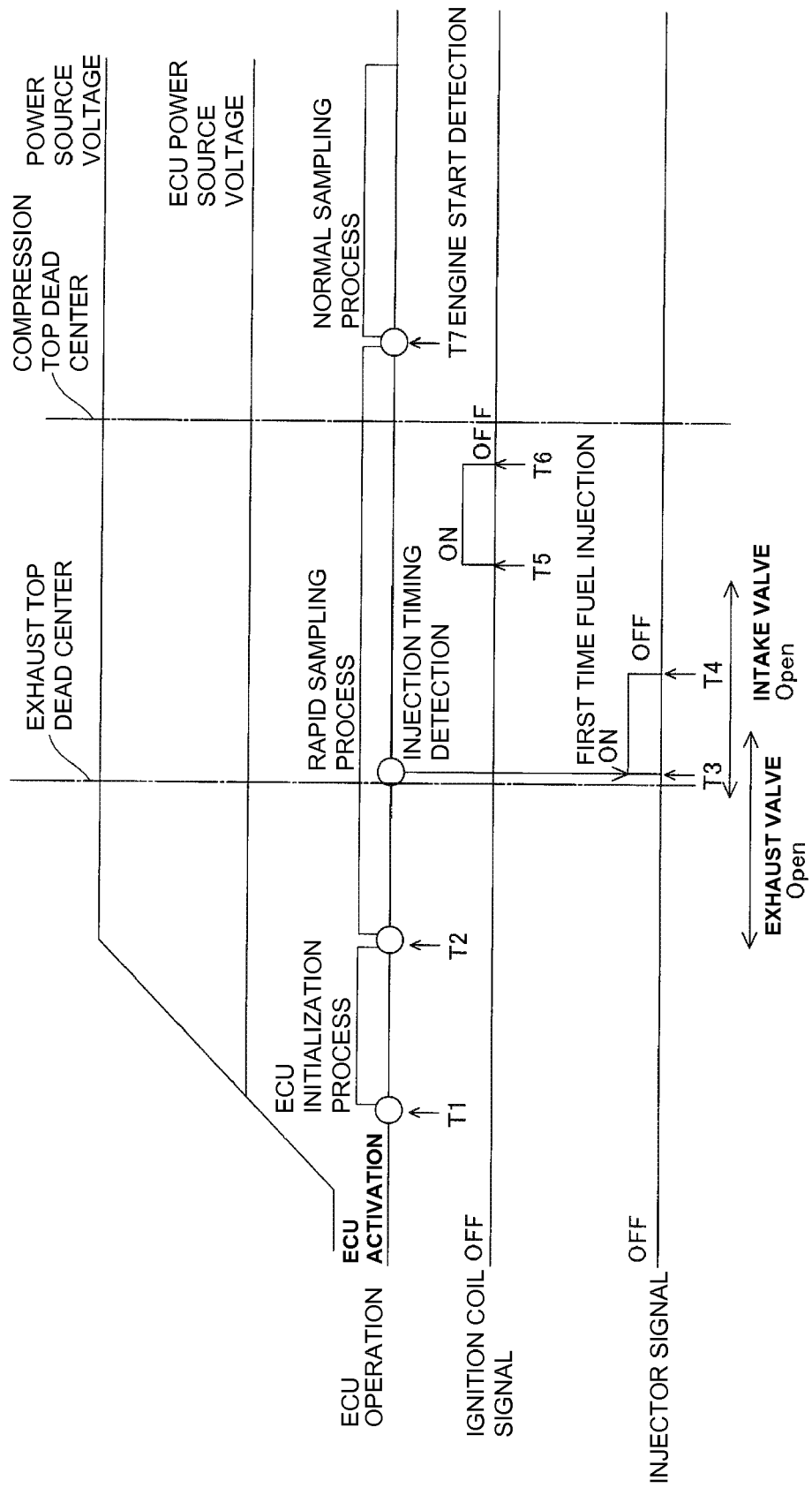
FIG. 5 is a timing chart of the operation of the motorcycle shown in FIG. 1.

In the present embodiment, as shown in FIG. 5, the ECU 38 is configured to perform an initialization process when arriving at the timing T1 at which the power source voltage of the ECU 38 exceeds an initialization voltage after being activated in accordance with the increase of the power source voltage of the generator 37. The initialization process involves preparation for control of primary ignition coil 26a and the injector 27 after the ECU 38 is activated. Then, the ECU 38 is configured to acquire data by executing AD conversion of the data detected by the various sensors (the pressure sensor 31, the throttle position sensor 32, the atmospheric pressure sensor 33, the atmospheric temperature sensor 34 and the water temperature sensor 35) at rapid sampling intervals (e.g., about 1 millisecond) in the period from the timing T2 at which the ECU initialization process is complete through the timing T7 at which the later-described engine 13 (see FIG. 2) is started. After the engine 13 is started (in the period after the timing T7 in FIG. 5), the ECU is configured to acquire data at a sampling interval (e.g., a sampling interval of several tens of milliseconds or more). In other words, since the ECU 38 needs to precisely calculate the amount of fuel which is initially injected by the injector 27 during the period from the timing T2 through the timing T3, corresponding to the timing at which fuel is first injected by the injector 27, the ECU 38 is configured to be capable of reliably acquiring the data from the various sensors at least in the period from the timing T2 through the timing T3.

In the present embodiment, the ECU 38 is configured to perform the AD conversion process for acquiring the data detected by the various sensors (the pressure sensor 31, the throttle position sensor 32, the atmospheric pressure sensor 33, the atmospheric temperature sensor 34 and the water temperature sensor 35) on the data transmitted from all the sensors simultaneously in parallel in the period from the timing T2 through the timing T7. Accordingly, the ECU 38 becomes capable of further shortening the intervals of acquisition of the data from the various sensors.

Also, the ECU 38 can function as an averaging process unit that performs an averaging of the data from the various sensors (the pressure sensor 31, the throttle position sensor 32, the atmospheric pressure sensor 33, the atmospheric temperature sensor 34 and the water temperature sensor 35). Specifically, the ECU 38 is configured to calculate the amount of fuel injected by the injector 27 (see FIG. 2) after acquiring data from the various sensors with the AD conversion process by using an averaging process value derived from the following Equation (1), which utilizes an exponentially weighted moving average:

$$A(n)=A(n-1)+(AD\_now-A(n-1))/N \qquad (1)$$

In Equation (1), A(n) indicates the averaging process value which is adopted for the calculation of the amount of fuel injected by the injector 27 (see FIG. 2). A(n−1) indicates the averaging process value which was adopted the previous time. Further, AD_now indicates the value of the data acquired after performing AD conversion of the data transmitted from the various sensors. Further, N indicates a smoothing constant.

With the abovementioned Equation (1), the degree of contribution of A(n−1) (the averaging process value adopted the previous time) toward A(n) may be changed by varying N. Specifically, when a larger value is assigned to N, the degree of contribution of A(n−1) toward A(n) becomes larger. On the other hand, when a smaller value is assigned to N, the degree of contribution of A(n−1) toward A(n) becomes smaller. In other words, when a larger value is assigned to N, the degree of contribution of the data AD_now which is acquired by the ECU 38 toward calculation of the averaging process value A(n) (which is adopted to calculate the amount of fuel to be injected by the injector 27) becomes small. On the other hand, when a smaller value is assigned to N, the degree of contribution of the data AD_now which is acquired by the ECU 38 toward calculation of the averaging process value A(n) (which is adopted to calculate the amount of fuel to be injected by the injector 27) becomes large.

In the present embodiment, the ECU 38 is configured to assign a value to the smoothing constant N in Equation (1) during the period from the timing T2 through the timing T7 which is smaller than a value of N after the engine 13 is started. Accordingly, during the period from the timing T2 at which the ECU initialization process is complete through the timing T7 at which the engine 13 is started, the ECU 38 uses a value of N which would correspond to a greater degree of contribution of the data AD_now acquired by the ECU 38 toward calculating the averaging process value A(n). In this manner, the ECU 38 becomes capable of adopting the averaging process value A(n) for the calculation of the amount of fuel injected by the injector 27 (see FIG. 2) which closely reflects the contribution from data at the time of acquisition from the various sensors. In addition, it becomes possible to calculate the averaging process value A(n) which is necessary for the calculation of the amount of fuel injected by the injector 27 in a shorter time. Due to the data acquisition process being conducted in short intervals and the averaging process which reflects a greater degree of contribution of the data as mentioned above, a rapid sampling process is performed in the period from the timing T2 through the timing T7.

In the present embodiment, as shown in FIG. 5, the ECU 38 is configured to calculate the amount of fuel to be injected by the injector 27 by utilizing the averaging process value acquired by the rapid sampling process in the period from the timing T2 through the timing T3 before the timing (the timing T3) at which the control of injecting fuel is performed. Then, the ECU 38 is configured to perform the control of the first injection for injecting fuel through the injector 27 by opening the solenoid valve (not shown) until the timing T4 by supplying electric power from the generator 37 (see FIG. 3) (transmitting an ON signal to the injector 27) at the timing T3 after the piston 19 (see FIG. 2) has arrived at the exhaust top dead center. Then, the ECU 38 is configured to stop supplying electric power from the generator 37 (transmit an OFF signal to the injector 27) at the timing T4.

The ECU 38 is configured to perform a control to supply electric power to the primary ignition coil 26a of the ignition plug 26 (transmit an ON signal to the ignition coil 26a) at the timing T5 and to cut off the supply of electric power (transmit an OFF signal to the ignition coil 26a) at the timing T6 which is before the arrival of the piston 19 (see FIG. 2) at the compression top dead center. The ignition plug 26 generates a spark at the timing T6. When the mixture including fuel is ignited by the spark, the mixture is combusted and expands rapidly. Accordingly, the piston 19 slides toward the bottom dead center at a higher speed than its sliding speed before the combustion. Therefore, the rotational speed of the crankshaft 25 increases rapidly. The ECU 38 is configured to determine that the engine 13 is started when the rotational speed of the crankshaft 25, which is detected by the crank angle sensor 36 (see FIG. 4), is determined to be exceeding a predetermined rotational speed (the timing T7). Here, in FIG. 5, a case is illustrated such that each of the fuel injection and ignition processes at the timings T3 through T6, respectively, is performed only once until the engine 13 is started (the timing T7). However, in some cases, the injecting of fuel and the igniting by the ignition plug 26 at the timing T3 through T6 are performed more than once for each starting process.

In the present embodiment, the ECU 38 is also configured to switch the intervals of acquisition of the data by performing an AD conversion on the data detected by the various sensors (the pressure sensor 31, the throttle position sensor 32, the atmospheric pressure sensor 33, the atmospheric temperature sensor 34 and the water temperature sensor 35) to longer intervals (e.g., several tens of milliseconds) after starting the engine 13 (at and after the timing T7) than before starting the engine 13 (in the period from the timing T2 through the timing T7). Further, the ECU 38 is configured to perform the AD conversion process on the data detected and transmitted by the various sensors not simultaneously but sequentially in series after the engine 13 is started (at and after the timing T7).

In the present embodiment, the ECU 38 is configured to assign a value to the smoothing constant N of the abovementioned Equation (1) after starting the engine 13 (at and after the timing T7) which is greater than the value of N assigned before starting the engine 13. Accordingly, the N value which corresponds to a smaller contribution of the data AD_now acquired by the ECU 38 is used to calculate the averaging process value A(n) after the engine 13 is started (at and after the timing T7). At this time, the ECU 38 can calculate an averaging process value which is adopted for the amount of fuel to be injected by the injector 27 as a value which is not susceptible to small variation of the operational state of the motorcycle 1 (see FIG. 1). Therefore, it becomes possible to calculate the amount of fuel to be injected by the injector 27 more reliably and precisely. Due to the data acquisition at long intervals and the averaging process, which reflects a smaller degree of contribution of the acquired sensor data as mentioned above, a normal sampling process is performed after the engine 13 is started (at and after the timing T7).

Figure 6:
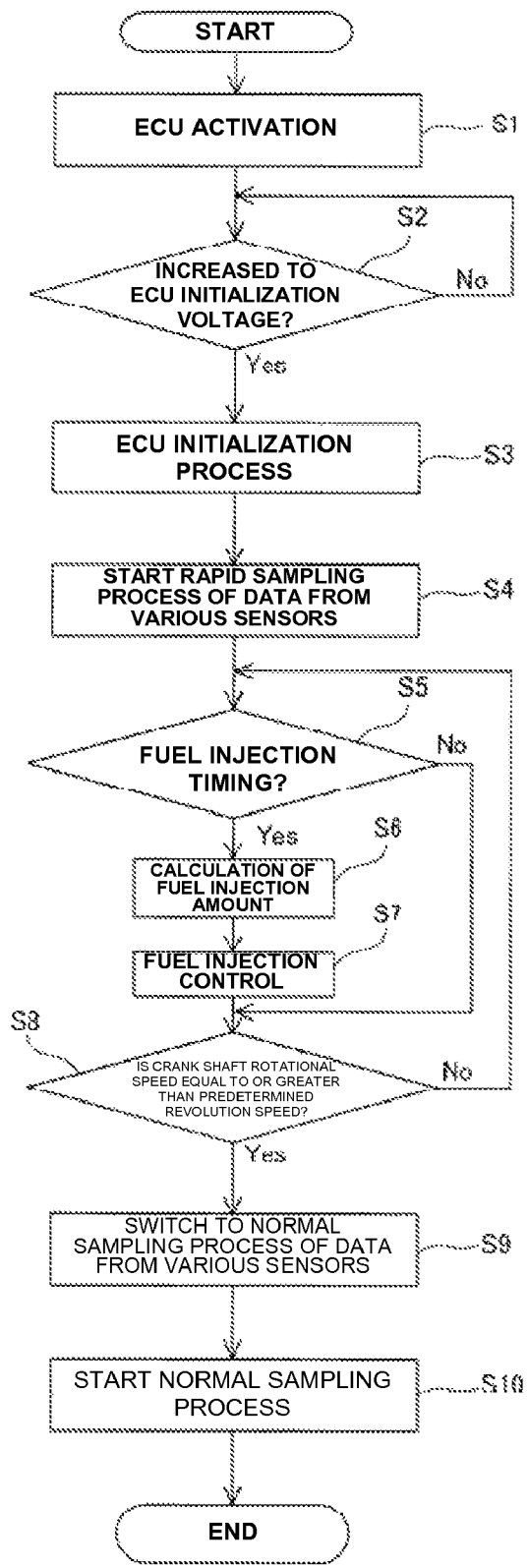
FIG. 6 is a flowchart of a fuel injection control process in accordance with the embodiment shown in FIG. 1.

FIG. 6 is a flowchart for illustrating schematically the control of fuel injection by the injector at the starting of the engine of the motorcycle 1 according to the embodiment shown in FIG. 1. The control operation of the ECU 38 when starting of the engine 13 of the motorcycle 1 is now described with reference to FIG. 1 through FIG. 3, FIG. 5 and FIG. 6.

First, as shown in FIG. 6, the crankshaft 25 (see FIG. 2) is rotated by the rotation of the kick pedal 17 (see FIG. 1) with a user's foot. After the power source voltage of the ECU 38 (see FIG. 3) becomes equal to or greater than an ECU activating voltage, the ECU 38 is activated in step S1. In step S2, it is determined whether or not the power source voltage of the ECU 38, to which electric power is supplied from the generator 37, has increased to a value which is equal to or greater than an ECU initialization voltage. The determination step is repeated until the power source voltage of the ECU 38 is determined to have been increased to a value which is equal to or greater than the ECU initialization voltage. When the power source voltage of the ECU 38 is determined to be equal to or greater than the ECU initialization voltage in step S2, the process proceeds to step S3.

The initialization process of the ECU 38 is performed in step S3, and the process proceeds to step S4. Then, in step S4, the rapid sampling process which performs the data acquisition process by executing an AD conversion on the data detected by the various sensors (the pressure sensor 31, the throttle position sensor 32, the atmospheric pressure sensor 33, the atmospheric temperature sensor 34 and the water temperature sensor 35) in short intervals (e.g., intervals of about 1 millisecond) is started. At this time, the AD conversion is performed on the data transmitted from the various sensors simultaneously in parallel. In addition, the averaging process is performed in accordance with the abovementioned Equation (1) to which a smaller smoothing constant N than the N constant assigned after the engine is started is assigned.

Then, in step S5, it is determined whether or not it is the timing that fuel is to be injected by the injector 27 (see FIG. 2). When it is determined as not being the timing that fuel is to be injected, the process proceeds to step S8. When it is determined as being the timing that fuel is to be injected by the injector 27 in step S5, the process proceeds to step S6, in which the amount of fuel to be injected by the injector 27 is calculated based on the averaging process value A(n) which is calculated by the rapid sampling process. Then, in step S7, fuel is injected by controlling the supply of electric current to the injector 27 from the generator 37 (see FIG. 3), and the process proceeds to step S8.

Then, in step S8, it is determined whether or not the crankshaft 25 is rotating at a speed equal to or greater than a predetermined rotational speed. When it is determined in step S8 that the crankshaft 25 is rotating below the predetermined speed, the process returns to step S5. In this case, the processes of step S5 through step S8 are repeated. When it is determined in step S8 that the crankshaft 25 is rotating at a speed which is equal to or greater than the predetermined speed, the engine 13 (see FIG. 2) is determined to have been started, and the process proceeds to step S9. In step S9, the data acquisition process from the various sensors (the pressure sensor 31, the throttle position sensor 32, the atmospheric pressure sensor 33, the atmospheric temperature sensor 34 and the water temperature sensor 35) is switched to the normal sampling process. The process proceeds to step S10 in which the normal sampling process is started, after which the process ends.

In the present embodiment, as mentioned above, the ECU 38 calculates the amount of fuel to be injected by the injector 27 based on data acquired from various sensors (the pressure sensor 31, the throttle position sensor 32, the atmospheric pressure sensor 33, the atmospheric temperature sensor 34 and the water temperature sensor 35) which detect the data necessary to calculate the amount of fuel to be injected by the injector 27. In addition, the ECU 38 is configured to perform the process of acquiring the data from the various sensors at intervals (of about 1 millisecond) before starting of the engine 13 (in the period from the timing T2 through the timing T7) which are shorter than intervals after starting of the engine 13 (at and after the timing T7). Accordingly, the ECU 38 can acquire more data in a period of time before starting of the engine 13 than during the same period after the engine 13 is started (at and after the timing T7). Consequently, before the fuel injection timing of the injector 27 (the timing T3), the ECU 38 can precisely calculate the amount of fuel to be injected by the injector 27 even at the time of the initial injection of fuel before starting the engine 13.

In the present embodiment, as mentioned above, the ECU 38 is configured to acquire the data from various sensors (the pressure sensor 31, the throttle position sensor 32, the atmospheric pressure sensor 33, the atmospheric temperature sensor 34 and the water temperature sensor 35) at longer intervals (e.g., several tens of milliseconds or more) after starting the engine 13 (at and after the timing T7) than before starting the engine 13 (in the period from the timing T2 through the timing T7). Accordingly, after starting the engine 13 at which time the operational load of the ECU 38 is increased due to the increase in the number of control processes performed by the ECU 38 caused by the increase in rotational speed of the crankshaft 25, the data for calculating the amount of fuel to be injected by the injector 27 can be acquired at longer intervals (e.g., intervals of several tens of milliseconds). As a result, it is possible to suppress the heavy operational load on the ECU 38 after starting the engine 13.

Further, in the present embodiment, as mentioned above, the ECU 38 is configured to acquire the data from the various sensors (the pressure sensor 31, the throttle position sensor 32, the atmospheric pressure sensor 33, the atmospheric temperature sensor 34 and the water temperature sensor 35) at shorter intervals (e.g., about 1 millisecond) during substantially all the period from the timing T2, at which the ECU initialization process is complete, through the timing T7, at which the engine 13 is started, than after starting the engine 13. Accordingly, in the case where multiple fuel injections are required during a single operation of the kick pedal 17 by a user, the ECU 38 can reliably acquire the data necessary for precise calculation of the amount of injected fuel for the second time or after, even when the engine is not started with the first injection of fuel by the injector 27. As a result, the easiness of starting of the engine 13 by one operation of the kick pedal 17 can be improved.

Furthermore, in the present embodiment, as mentioned above, the ECU 38 is configured to calculate the amount of fuel which is to be injected by the injector 27 by utilizing the averaging process which has a smaller value assigned to the smoothing constant N in Equation (1) before starting the engine 13 (in the period from the timing T2 though the timing T7) than the assigned N value after starting the engine 13 (at and after the timing T7) so that the degree of contribution of the data (AD_now) acquired from the various sensors (the pressure sensor 31, the throttle position sensor 32, the atmospheric pressure sensor 33, the atmospheric temperature sensor 34 and the water temperature sensor 35) becomes greater than that of the averaging process after starting the engine 13. Accordingly, the ECU 38 can calculate the amount of fuel which is to be injected by the injector 27 by utilizing an N value with which the degree of contribution of the data acquired from the various sensors is large. As a result, the ECU 38 can reliably calculate the amount of fuel to be injected before the first timing (the timing T3) of fuel injection by the injector 27, and precisely reflect the state of the motorcycle 1 in the calculation at that time.

In the present embodiment, as mentioned above, the ECU 38 is configured to switch to an averaging process which has a greater value assigned to the smoothing constant N in Equation (1) when the engine 13 is determined to have been started than the N value assigned before starting the engine 13 so that the degree of contribution of the data acquired from the various sensors (the pressure sensor 31, the throttle position sensor 32, the atmospheric pressure sensor 33, the atmospheric temperature sensor 34 and the water temperature sensor 35) becomes smaller than that of the averaging process before starting the engine 13 (in the period from the timing T2 through the timing T7). Accordingly, the averaging process value which carries a smaller degree of contribution of the data acquired by the ECU 38 can be calculated. Therefore, the ECU 38 can calculate the averaging process value which is not susceptible to temporal variation of the state of the motorcycle 1. As a result, the ECU 38 can calculate a stable amount of fuel to be injected which is not susceptible to temporal variations of the motorcycle 1 after starting the engine 13.

In addition, in the present embodiment, as mentioned above, the ECU 38 is configured to perform the process of acquiring the data from all the various sensors (the pressure sensor 31, the throttle position sensor 32, the atmospheric pressure sensor 33, the atmospheric temperature sensor 34 and the water temperature sensor 35) simultaneously in parallel before starting the of engine 13 (in the period from the timing T2 through the timing T7). With this configuration, the data for calculating the amount of fuel to be injected can be reliably acquired before the first injection of fuel by the injector 27 in comparison with the case when the data is acquired not simultaneously but sequentially in series from the various sensors.

Moreover, in the present embodiment, as mentioned above, the ECU 38 is configured to determine whether or not the engine 13 is started based on the rotational speed of the crankshaft 25, which is detected by the crank angle sensor 36. With this configuration, the determination as to whether or not the engine 13 is started can be performed based on the rotational speed of the crankshaft 25 detected by the crank angle sensor 36 which is normally provided to the engine 13.

It is to be noted that the embodiments disclosed herein are examples in all aspects and should not be considered to be restrictive. The scope of the present invention is to be construed in view of the scope of claims, not by the abovementioned description of the embodiments. Further, the scope of the present invention includes equivalents to the scope of claims and all modifications made within the scope of claims.

For example, examples in which the vehicle of the present invention is implemented as a motorcycle having an injector are shown in the abovementioned embodiments. However, the invention is not limited to this, and the present invention can be applied to other vehicles having an injector, such as automobiles, tricycles, and All Terrain Vehicles (ATVs).

Further, examples in which the vehicle is implemented as an off-road motorcycle are shown in the abovementioned embodiments. However, the invention is not limited to this, and the vehicle of the present invention can be also implemented as an on-road motorcycle.

Further, examples in which the fuel injection control system of the present invention is used in a motorcycle are shown in the abovementioned embodiments. However, the invention is not limited to this, and the present invention can be also applied to a fuel injection control system for an engine which is started with electric power which is manually generated with a user's hand or foot, such as electrical generators and chain saws.

In the present exemplary embodiment, the present invention is applied to a motorcycle with no battery. However, the invention is not limited to this, and the present invention can also be applied to a motorcycle with a battery. In this case, the easiness of starting of the motorcycle can be improved even when the battery is discharged, by applying the present invention to the starting of the motorcycle.

Further shown in the present embodiment are examples in which an ECU determines whether or not an engine is started using the rotational speed of a crankshaft. However, the invention is not limited to this, and the ECU of the present invention can be also configured to determine the engine has been started after a predetermined time passes from an ignition timing of an ignition plug. The ECU of the present invention can also be configured to determine whether or not the engine has been started by separately disposing a component which directly detects starting of the engine.

Moreover, in the present embodiment, an in-pipe pressure sensor, a throttle position sensor, an atmospheric pressure sensor, an atmospheric temperature sensor and a water temperature sensor are shown as examples of sensor units which detect data for calculating the amount of fuel injected by an injector. However, the invention is not limited to this, the ECU of the present invention can be also configured to calculate the amount of fuel injected by the injector by utilizing detection values of other sensors such as an oxygen sensor, a vehicle speed sensor and the like in addition to the various sensors described above.

In the present embodiment, examples of performing the averaging process by utilizing the exponentially weighted moving average are shown. However, the invention is not limited to this, and the present invention can also utilize another averaging process.

Further shown in the present embodiment are examples in which the intervals utilized in the data acquisition process by the ECU before starting the engine are intervals of about 1 millisecond. However, the invention is not limited to this, and the present invention can also utilize intervals which are shorter than 1 millisecond or longer than 1 millisecond as long as sufficient data acquisition can be performed with the intervals to calculate the injection amount by the first injection timing of fuel by the injector.

What is claimed:
1. A fuel injection control system, comprising:
a fuel injection device for an engine;

a sensor unit for detecting data for calculating an amount of fuel to be injected by the fuel injection device;

a control unit for calculating the amount of fuel to be injected by the fuel injection device based on the data detected by the sensor unit;

a power generation unit which is driven in accordance with the engine and which supplies electric power to the fuel injection device and the control unit; and a start device for starting the engine;

wherein the control unit is configured to acquire the data from the sensor unit at a first sampling rate before the engine is started and a second sampling rate after the engine is started, wherein the first sampling rate is higher than the second sampling rate, wherein the control unit includes an averaging process module which performs an averaging process on the data acquired from the sensor unit, and wherein the averaging process module is configured to calculate an averaging process value which carries a greater degree of contribution from the most recently acquired data from the sensor unit in a predetermined period before starting the engine than after starting the engine.

2. The fuel injection control system of claim 1, wherein the control unit is configured to switch to the second sampling rate for acquisition of the data from the sensor unit when the engine is determined to be started.

3. The fuel injection control system of claim 1, wherein the control unit is configured to acquire the data from the sensor unit at the first sampling rate during a substantial portion of a period from when the control unit is activated until when the engine is started.

4. The fuel injection control system of claim 1, wherein the averaging process module is configured to calculate the amount of fuel to be injected by the fuel injection device based on the calculated averaging process value.

5. The fuel injection control system of claim 1, wherein the averaging process module is configured to calculate an averaging process value that carries a smaller contribution of the data acquired from the sensor unit after the engine is started than before the engine is started.

6. The fuel injection control system of claim 1, wherein the engine includes a crankshaft which rotates in accordance with the engine, the sensor unit includes a crank angle sensor which detects the rotational speed and position of the crankshaft, and the control unit is configured to determine whether or not the engine is started based on the rotational speed of the crankshaft which is detected by the crank angle sensor.

7. The fuel injection control system of claim 1, wherein the start device for starting the engine comprises a manual start device configured to be driven by a human's hand or foot for starting the engine by manually driving the power generation unit.

8. A vehicle comprising the fuel injection control system of claim 1.

9. A fuel injection control system, comprising:
a fuel injection device for an engine;
a plurality of sensor units for detecting different kinds of data to be used in calculating an amount of fuel to be injected by the fuel injection device;
a control unit configured to calculate the amount of fuel to be injected by the fuel injection device based on the data detected by the sensor units;
a power generation unit which is driven in accordance with the engine and which supplies electric power to the fuel injection device and the control unit; and
a start device for starting the engine by driving the power generation unit;
wherein the control unit is configured to acquire the data from the sensor units at a first sampling rate before the engine is started and a second sampling rate after the engine is started, wherein the first sampling rate is higher than the second sampling rate, and wherein the control unit includes an averaging process module which performs an averaging process on the data acquired from the sensor unit, and wherein the averaging process module is configured to calculate an averaging process value which carries a greater degree of contribution from the most recently acquired data from the sensor unit in a predetermined period before starting the engine than after starting the engine.

10. The fuel injection control system of claim 9, wherein the control unit is configured to acquire the detected data from the sensor units simultaneously in parallel in the predetermined period before the engine is started.

11. The fuel injection control system of claim 9, wherein the data detected by the sensor units includes at least one type of data selected from the group consisting of air pressure data from an intake pipe for supplying air to the engine, throttle opening data from a throttle valve disposed in the intake pipe, atmospheric pressure data, engine coolant temperature data, and atmospheric temperature data.

12. The fuel injection control system of claim 9, wherein the start device for starting the engine comprises a manual start device configured to be driven by a human's hand or foot for starting the engine by manually driving the power generation unit.

13. A vehicle comprising the fuel injection system of claim 9.

14. An internal combustion engine comprising:
a fuel injection device for injecting fuel to a cylinder of the engine;
a sensor unit for detecting data for calculating an amount of fuel to be injected by the fuel injection device;
a control unit for calculating the amount of fuel to be injected by the fuel injection device based on the data detected by the sensor unit;
a power generation unit which is driven in accordance with the engine and which supplies electric power to the fuel injection device and the control unit; and
a manual start device configured to be driven by a human's hand or foot for starting the engine by manually driving the power generation unit;
wherein the control unit is configured to acquire the data from the sensor unit at a first sampling rate before the engine is started and a second sampling rate after the engine is started, wherein the first sampling rate is higher than the second sampling rate, and wherein the control unit includes an averaging process module which performs an averaging process on the data acquired from the sensor unit, and wherein the averaging process module is configured to calculate an averaging process value which carries a greater degree of contribution from the most recently acquired data from the sensor unit in a predetermined period before starting the engine than after starting the engine.

15. An engine control method, the method comprising the steps of:
(a) acquiring data from a sensor unit with a control unit for calculating an amount of fuel to be injected by a fuel injection device; and
(b) calculating with the control unit an amount of fuel to be injected by a fuel injection device based on the acquired data; wherein acquired data is acquired at a first sampling rate before the engine is started and a second sampling rate after the engine is started, wherein the first sampling rate is higher than the second sampling rate, and wherein the control unit includes an averaging process module which performs an averaging process on the data acquired from the sensor unit, and wherein the averaging process module is configured to calculate an averaging process value which carries a greater degree of contribution from the most recently acquired data from the sensor unit in a predetermined period before starting the engine than after starting the engine.

16. An engine control unit configured to calculate the amount of fuel to be injected by a fuel injection device of an engine based on data acquired from sensor units, wherein the control unit is further configured to acquire the data from the sensor units at a first sampling rate before the engine is started and a second sampling rate after the engine is started, wherein the first sampling rate is higher than the second sampling rate, and wherein the control unit includes an averaging process module which performs an averaging process on the data acquired from the sensor units, and wherein the averaging process module is configured to calculate an averaging process value which carries a greater degree of contribution from the most recently acquired data from the sensor unit in a predetermined period before starting the engine than after starting the engine.

17. The engine control unit of claim 16, wherein the control unit is configured to acquire the data from the sensor units simultaneously in parallel in the predetermined period before the engine is started.

* * * * *